US005733634A

United States Patent [19]

Karel

[11] Patent Number: 5,733,634

[45] Date of Patent: Mar. 31, 1998

[54] PRINTING PROCESS WITH HIGHLIGHTED COLOR AND APPEARANCE OF DEPTH

[76] Inventor: Norman E. Karel, 177 Vallecitos De Oro, San Marcos, Calif. 92069

[21] Appl. No.: 559,617

[22] Filed: Nov. 20, 1995

[51] Int. Cl.[6] .......... B32B 3/00

[52] U.S. Cl. .......... 428/195; 428/411.1; 427/256; 427/261; 283/94; 283/107; 283/109; 283/111; 156/60

[58] Field of Search .......... 156/277, 60; 430/195; 428/411.1, 913, 914, 195; 283/94, 107, 109, 111; 427/256, 261

[56] References Cited

U.S. PATENT DOCUMENTS

| | | |
|---|---|---|
| 4,933,218 | 6/1990 | Longobardi . |
| 5,082,703 | 1/1992 | Longobardi . |
| 5,106,126 | 4/1992 | Longobardi et al. . |
| 5,223,357 | 6/1993 | Lovison . |

*Primary Examiner*—William Krynski

*Attorney, Agent, or Firm*—Brown, Martin, Haller & McClain, LLP

[57] ABSTRACT

A printing process is disclosed which easily and rapidly produces products containing images which are very striking and dramatic. The process uses ordinary paper or foil substrates and prints white and color layers using conventional printing equipment and operations, keeping production costs low, making the process and resulting products quite economical. The variety of visual appearances that can be created provide wide flexibility to create images with dramatic depth and highlighting. The invention uses reflective, white and color layers of varying densities and areas of application, applied to ordinary paper- or foil-based substrates, to achieve the highlighted and depth-appearing images. The printed products of the present invention, with their dramatic images incorporating highlights and the appearance of depth, can be used as printed materials for many purposes, including packaging, publications, illustrations, cards, and numerous other applications. The images are brighter and have greater depth appearance that paper-substrate images formed by conventional prior art processes, and are much more attractive and eye catching than the resulting prior art products. They are comparable with much higher priced images formed by expensive complex printing techniques, and at the same time are much more economical.

23 Claims, 3 Drawing Sheets

PRINTING PROCESS WITH HIGHLIGHTED COLOR AND APPEARANCE OF DEPTH

BACKGROUND OF THE INVENTION

1. Field of the Invention

The invention herein relates to color printing process. More particularly it relates to processes for printing on various types of paper and foil substrates.

2. Description of the Prior Art

Four color printing processes such as lithography have been known for many years and are used widely for printing of color publications, packaging and graphics. Conventional four color printing however, while providing a multitude of colors, still presents a flat two-dimensional visual image, lacking any significant appearance of depth.

Many techniques have been used in the past to attempt to provide an appearance of depth to printed flat pieces. However, these have normally required forming multiple layers through use of separate devices laminated to the flat piece, so that the piece is no longer in the form of a thin sheet. Other processes have required the use of unusual printing techniques and are often limited to use with special substrates, such that they are difficult and expensive to perform and cannot be used with conventional printing products and techniques. For example, U.S. Pat. No. 5,106,126 describes a process for reverse printing on a transparent facing material such as a Mylar® polyester sheet or a glass sheet. While the process does produce an appearance of depth and highlighting in selected areas, all printing must be done as a mirror image and the printing steps must be performed in an order which is the reverse of conventional printing, thus making it difficult to use normal printing equipment without substantial modification of the normal printing techniques. Commercial products which have been made by this process, such as packaging, are quite expensive.

Until the present time, no simple method has been known for imparting an appearance of depth and highlighting to a process color printed piece where the printing was done on a conventional substrate such as paper or foil and which was capable of being done using ordinary process color printing equipment techniques and materials, and operating in a manner consistent with prior conventional printing practice.

SUMMARY OF THE INVENTION

The present invention provides a process which easily and rapidly produces images which are very striking and dramatic. The process uses ordinary paper or foil substrates and prints white and color layers using conventional printing equipment and operations, keeping production costs low, making the process and resulting products quite economical. The virtually infinite variety of combinations of visual appearances that can be created gives the artist and graphic designer wide flexibility to create images with dramatic depth and highlighting, thus making this invention extremely versatile and yielding products which are highly attractive and desirable.

The invention uses a unique combination of reflective, white and color layers of varying densities and areas of application, applied to ordinary paper or foil-based substrates, to achieve highlighted and depth-appearing images which previously could only be obtained by using expensive, exotic printing techniques and special substrates.

In one broad embodiment, the invention is a color printing process for printing a colored image which includes at least one area which has a highlighted or depth appearance on a substrate, which process comprises providing an opaque substrate sheet with a front side and a back side, at least a portion of the front side providing a reflective metallic appearance; applying to an area of such reflective portion of the front surface a first coating comprising a plurality of white dots; applying to at least portions of the first coating a second coating comprising process colors, the process colors comprising a plurality of component color dots disposed in groupings of at least two different densities, the densities and locations of the coating of white dots and groupings of color dots being predetermined by the image and the. highlighted appearance to be produced; and creating the image by the juxtaposition respectively of the coating of white dots and the groupings of color dots over the reflective surface of the substrate; whereby those portions of the image with lesser densities of white dots and of color dots permit visual observation of the underlying reflective substrate and yield a visual appearance of highlighting as compared to those other portions of the image where the densities of white dots or color dots is greater.

In a preferred embodiment, the process further comprises disposing the coating of white dots over the area of the reflective portion in groupings of at least two different densities, with the degree of opacity provided by each grouping being directly related to the density of the grouping.

In yet another broad embodiment, the invention comprises a color printing sheet product having a colored image thereon which includes at least one area which has a highlighted or depth appearance, which product comprises an opaque substrate sheet with a front side and a back side, at least a portion of the front side providing a reflective metallic appearance; a first coating comprising a plurality of white dots applied to an area of such reflective portion of the front surface, and a second coating applied to at least portions of the first coating and reflective portion of the front side, the second coating comprising process colors, the process colors also comprising a plurality of component color dots disposed in groupings of at least two different densities, the densities and locations of the groupings of white dots and groupings of color dots being predetermined by the image and the highlighted appearance to be produced; whereby the image in created by the juxtaposition respectively of the coating of white dots and the groupings of color dots over the reflective surface of the substrate in which those portions of the image with lesser densities of white dots and of color dots permit visual observation of the underlying reflective substrate and yield a visual appearance of depth or highlighting as compared to those other portions of the image where the densities of white dots or color dots is greater.

In another preferred embodiment, the invention further comprises having the plurality of white dots comprising the first coating disposed over the ea of the front side in groupings of at least two different densities, with the degree of opacity provided by each grouping being directly related to the density of the grouping.

The printed products of the present invention, with their dramatic images incorporating highlights and the appearance of depth, can be used as printed materials for many purposes, including packaging, publications, illustrations, and numerous other applications. The images are brighter and have greater depth appearance than paper-substrate images formed by conventional prior art processes, and are much more attractive and eye catching than the resulting prior art product images. The product images are comparable with product images formed by expensive and complex printing techniques such as film printing, and at the same time the products of this invention are much more economical to produce.

DETAILED DESCRIPTION AND PREFERRED EMBODIMENTS

Figure 1:
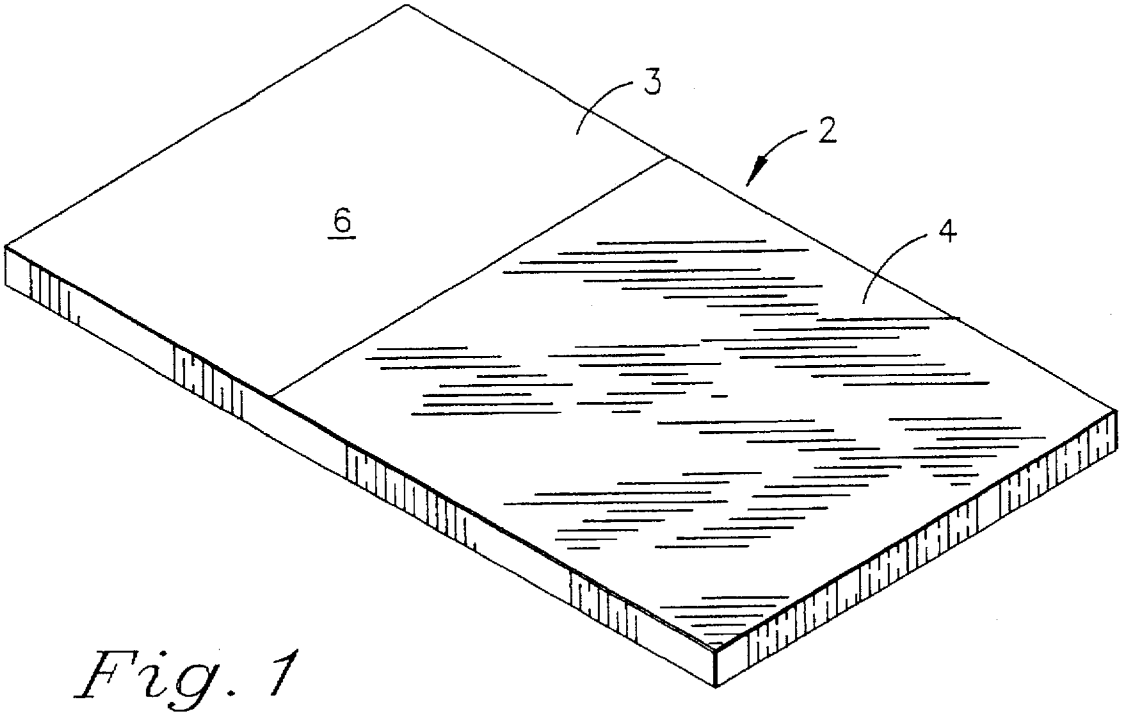
FIG. 1 is a schematic perspective view of a substrate with a front side which has a portion which has a reflective metallic appearance.

The invention herein will be best understood by reference to the drawings, which illustrate schematically the various steps of the process intended to form the desired product and the appearance of the intermediate pieces formed during the process. While the process will be illustrated using simple geometric shapes to indicate the various printed portions, it will be understood that these are merely representative for simplicity and clarity in the drawings and that in fact a wide variety of highly complex graphics, illustrations, drawings, lettering and other multi-color designs, patterns or layouts can be successfully created with the present invention.

Figure 8:
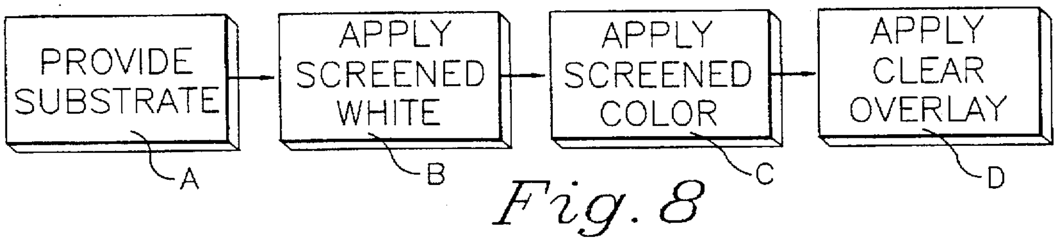
FIG. 8 is a block diagram indicating the steps of the present process.

Referring to the Figures, the present product and process start with providing a reflective metallic substrate 2 (step A in FIG. 8). In the embodiment illustrated the substrate is formed of a paper/foil laminate. The paper layer 3 may be formed from any convenient type of printing paper stock of whatever basis weight is desirable for the intended end use of the printed product, whether that might be a form of packaging or of some type of publication. Numerous paper compositions are well known and the various type of additives which can be incorporated into the paper for different purposes are also well known and widely described; see for instance, Blair (ed.), *The Lithographers Manual*, (7th Edn.: 1983), Chapter 13, Sections 8 and 9.

Figure 2:
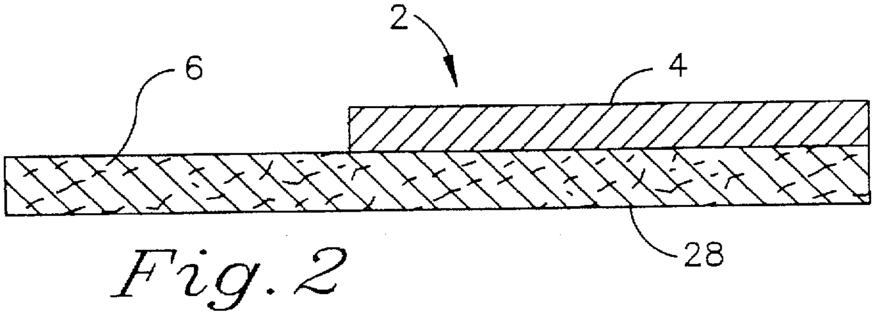
FIG. 2 is a schematic side elevation view of a substrate having a reflective metallic layer applied to a portion of one side.
Figure 3:
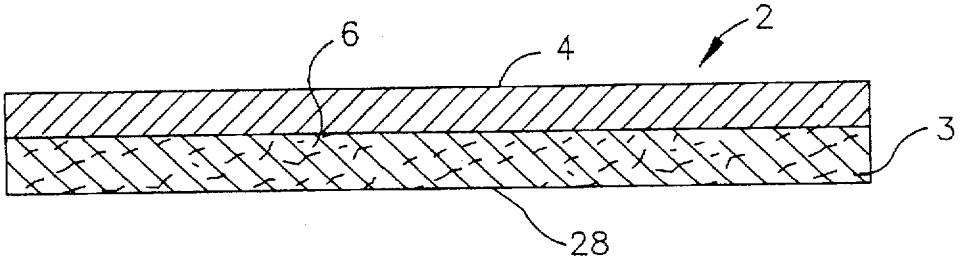
FIG. 3 is a schematic side elevation view of a substrate having a reflective metallic layer applied to the entire surface of one side.

To the paper portion 3 of the substrate 2 is applied a metallicized layer 4 which may cover part or all of the paper, as indicated respectively in FIGS. 2 and 3. This layer, which provides the visual appearance of a reflective metal surface, may be applied by spraying a metal-containing coating onto the top surface 6 of the paper 3, or by adhering a metallicized sheet such as thin metal foil sheet to the paper surface 6. While the foil or coating may be applied only in selected areas, as illustrated in FIG. 1, it is preferred in most cases to have the entire front surface 6 of the paper 3 be covered with the reflective layer 4. Papers with preapplied foil coverings forming paper foils are available commercially and are entirely satisfactory for use in the present invention. These commercial products are a laminate of the paper and the foil and are available in a range of thicknesses and weights, such that foil papers which any desired degree of flexibility or stiffness can be selected, depending on, for instance, whether the end use of the printed product is to be as a single printed page such as in a publication, or is to be used as some form of packaging in which substantial rigidity of the packaging is needed.

Alternatively, where a completely reflective front surface is desired, it is possible to use a foil sheet 4 alone as the substrate 2, without any paper backing 3. However, for the remainder of this description, it will be assumed that the reflective substrate 2 is a foil paper with a metallic foil layer 4 completely covering the surface 6 of the paper layer 3. Those skilled in the art will be readily able to select the appropriate type of paper, foil or paper/foil laminate for use with the desired type and weight of final product to be produced.

Figure 4:
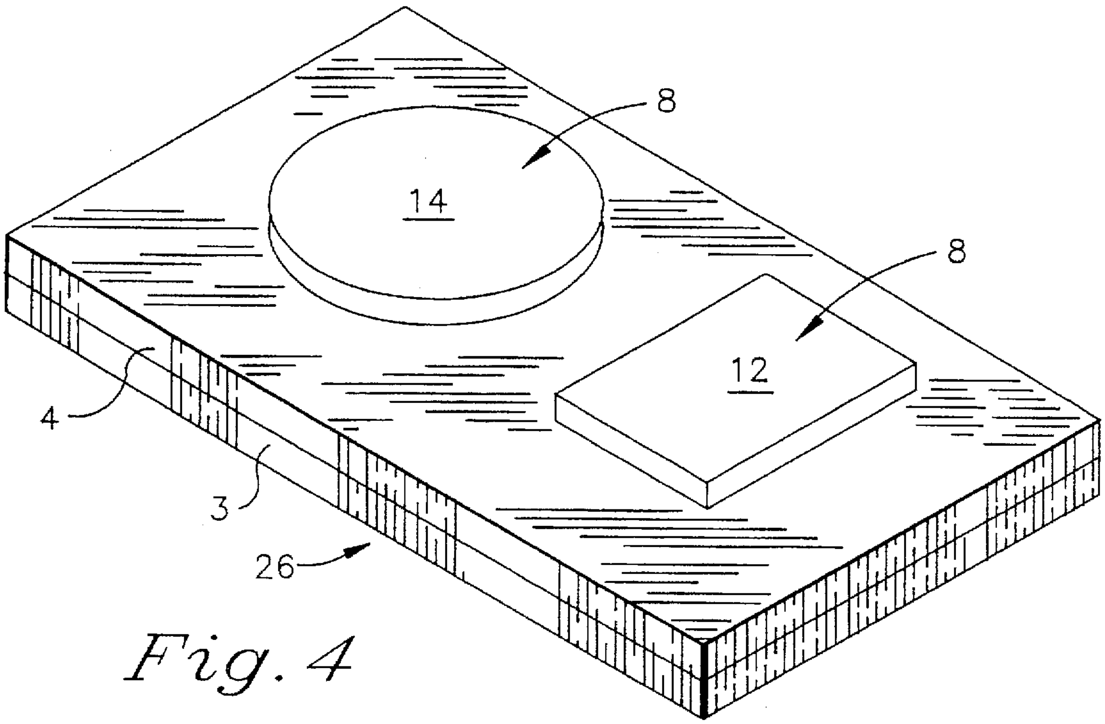
FIG. 4 is a schematic perspective view of the substrate of FIG. 3 in an embodiment having two areas of white dots applied thereto, one in a circular pattern and one in a square pattern.
Figure 5A:
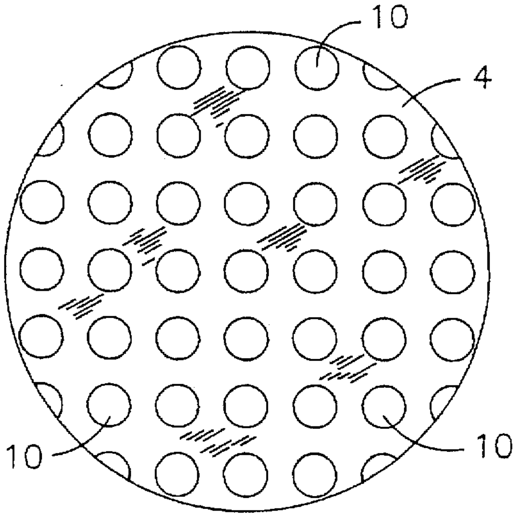
FIGS. 5A and 5B are schematic close-up detail views of a portion of respectively the circular area and the square area of the white dot areas of FIG. 4 illustrating an embodiment in which there are different densities of applied white dots.
Figure 5B:
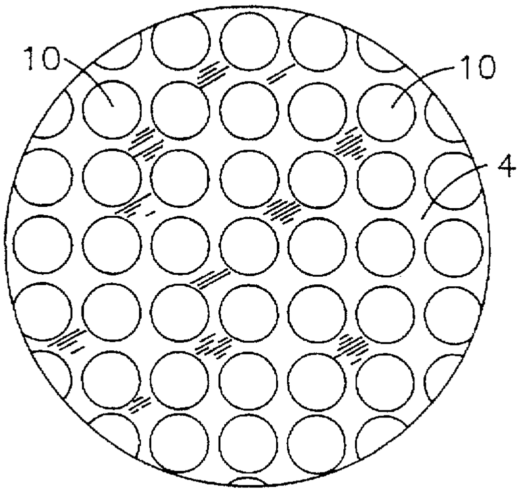

The first printing step in the process (step B in FIG. 8) is to apply a while coating layer on top of the foil layer 4. The white layer, generally designated 8, will be applied by a conventional screen application technique, in which the white pigment is applied as discrete dots 10 over areas of the foil surface 4, as illustrated in FIGS. 4, 5A and 5B. As is well known, screening using different screen meshes places the various dots in a predefined grid where the dot centers are spaced at equal intervals. However, by use of different screen sizes, greater or lesser amounts of white pigment will be passed through the screen openings and the resulting dots 10 will be of varying sizes, each depending on the particular screen mesh which was used to form that area of dots. The relative degree of surface coverage of the resulting screened dots is known as the density of the layer. An area of low density will have the same number of dots as an area of high density, but the individual dots will be substantially smaller so that much more of the backing surface shows through, as illustrated by comparing FIGS. 5A and 5B and the amount of the underlying metal surface 4 which can be seen in the two figures. At the highest densities, the dots are sufficiently large that their edges merge and they form a continuous opaque coating over the highest density area, or, even if slightly less dense, produce an area of high density coating which gives the visual appearance of being continuous and opaque, since the remaining spaces between dots are too small for the viewer's unaided eye to discern the underlying surface.

Therefore, it will be understood by those skilled in the art that while the term "dots" is used to refer to the form of application of color and white pigment in this description, the dots as applied can either be sufficiently separated to form a lower density white or colored area of application with the dots visibly discrete under magnification, or they can be sufficiently large that they merge into a continuous or substantially continuous layer in an application area of high density, with some portion of all of each dot's perimeter in such area merged with those of its neighbors, such that the dots are not entirely visibly discrete under magnification.

In the present process, one may use only a single density of white dots so that the white coating is uniform in appearance over its extent. It is preferred, however, to use a plurality of different screen sizes to apply the white layer, thus providing a like plurality of different white dot densities and appearances. The depth and highlight effects provided by the present process are enhanced by having different densities of white dots 10 in various areas of the final image, as determined from the nature of the intended image itself. This preferred embodiment is illustrated schematically in FIG. 4 in that the square area 12 of application of the dots 10 exemplifies a higher density white area and the circular area 14 exemplifies a lower density area. It will of course be understood that there can and usually will be a variety of different densities in different locations across the foil surface, and also that the white dot application areas may, but in most cases will not, cover the entire extent of the foil surface. For instance, in areas where reverse printing is to appear, there will be no white pigment applied.

Once the white coating is applied in the dot density or densities dictated by the intended final image and the coating has dried, the white coated foil paper is put through a color printing step (step C in FIG. 8) to impart the desired colors to form the image. Preferably this will be a conventional four color printing process, in which the standard four process colors of yellow, cyan, magenta and black are used. If desired, however, one may substitute a different yellow, blue or red hue for the respective process color to give a different color spectrum in the final image. The four color process starts with conventional color separation of the desired image. An convenient color separation techniques may be used. Definitions of these techniques are found widely in the literature. Excellent descriptions and examples are found in the aforementioned *Lithographer's Manual* in Chapter 6 and also in AldrichRuenzel (ed.), *Designer's Guide to Print Production*, (1990), pgs. 74–78. These two texts also describe how one can vary the basic process color hues to obtain the color spectrum with the printing inks desired. Once the color separations are made and the desired four color hues determined, one can use a standard four color sequential printing press to impart the process colors to the white coated paper foil sheet. In a standard four color press, the four process colors are applied sequentially in a single pass of the sheet through the press. Commonly the colors are applied in the sequence of yellow, magenta, cyan and finally black. Each color is applied only to that area of the sheet surface where a final hue which includes that color as a component is to appear. For instance, yellow will be printed only on those areas of the final image where a hue with a yellow component (a yellow, green or orange) will appear. The process color dots either stand alone or overlay each other to form the desired combinations of hues, such that the visual appearance of the final image to the viewer is one of many different hues produced by the passage of light through the transparent process color inks to the viewer's eye according to the known principles of color combination and perception.

Alternatively, one may use other known color ink printing processes, such as two-, three- or other multi-color processes. Each of the process colors is applied as a series of dots by a screen, in a manner analogous to the white dots. Each of the colors has its own range of dot densities depending on the screens used and the amount of that color which is to be a component in the hues of each segment of the final image. Where the observed hue is for instance, to be a green, yellow and cyan will be overlaid and the relative densities of each of the two process colors for dots in that region will determine whether the perceived "green" is a neutral green, a yellow-green or a blue-green. There are a number of recognized systems for uniformly describing different hues and determining screen patterns and densities for application of the respective process colors, of which the most widely used is the Pantone® color matching system.

As with the white dots, color dots can also be sufficiently large that they abut or merge and form a continuous or substantially continuous colored area. This is particularly common with black color, although any other hue can also have a virtually continuous area.

There are a wide variety of commercial transparent printing inks which will provide the different process colors desired. These are available from art supply and printing supply houses. Those skilled in the art will be readily able to select appropriate inks for printing the color spectrum called for by the desire image.

Alternatively, but less preferred, each of the process colors can be applied in a separate press run such as where the printer does not have a continuous four color press available.

Figure 7A:
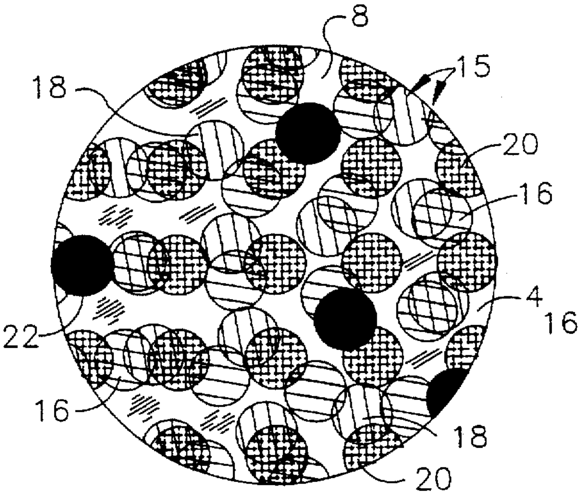
FIGS. 7A and 7B are schematic close-up detail views of two segments of the color dot stripe of FIG. 6, illustrating different densities of applied color dots, with FIG. 7A also schematically indicating typical multi-color dots (the different colors not being also shown in FIG. 7B to maintain clarity of the Figure).
Figure 7B:
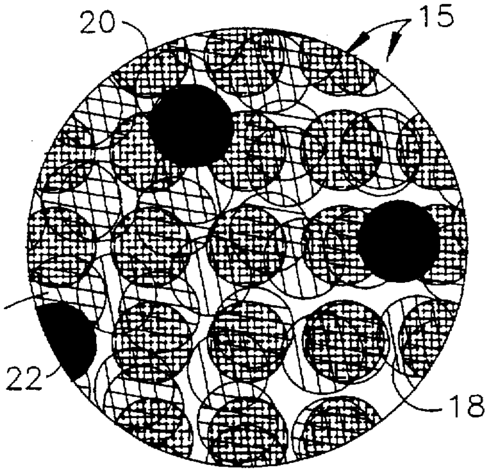

Typical dot densities and color combination dots (generally indicated as 15) are illustrated in FIGS. 7A and 7B. (The separate process colors of cyan 16, magenta 18, yellow 20 and black 24 are indicated in both Figures, but the separate color identities are less apparent in FIG. 7B.) Also illustrated is the conventional four color printing practice of aligning the separate color screens at slight angles to each other.

It will also be seen as illustrated in FIG. 7A that in some areas the color dots 15 will be applied over a white dot coating 8, and in others where there is no white coating they will be applied directly onto the foil layer 4, such that the visual appearance in some of the color areas will show a reflective underlay where printed on foil, or a bright underlay where printed on the white dots, or a combination of the two where the white coating itself overlays the foil and is of a low or medium density.

The resulting visual appearance of the image formed by this process will project a variety of different areas highlights and perceived depth, depending on the combination in each area of the relative visibilities of the foil background, white coating and color layer and the respective degrees of density of each. The more dense the top layer, the less effect the underlying layer or layers will have in defining the visual image in that area for the observer. For instance, where the color dot density is very high, regardless of whether the dots are applied to the white coating or directly to the foil, the visual appearance will be essentially that of a pure color with little or no reflective depth or enhanced brightness, since the white and foil layers beneath will be substantially obscured. On the other hand, where the color layer density is less, more of the underlying white coating and/or reflective metallic surface will be visible, imparting the appearance to the observer of a brightened area with white, a reflective area with the metal foil or a combination of the two. Of course one will also see the hue of wherever colors are also applied, so that the brightness and reflection seen through the color layer retains the color hue but imparts additional brightness or depth from the reflectivity to that process inks. Thus in an area where the color dot density is high, the color saturation will appear to be greater, while in an area where the dot density is less and more of the white or reflective layers appear, the color saturation will appear less and the brightness or depth will appear greater. The particular hue at any point will of course be determined by the respective combinations of process color dots and dot densities at that particular location.

Gradients of density in the white layer and the color layer can vary in any convenient pattern which conforms to the desired image. The degree of density can vary linearly, as for instance a large a linear part of the image (such as a large letter "T") appears, with distinct highlights and depth appearing at one end and shading linearly to highly saturated color at the other end. Density can also vary radially, such as where one would want a particular point in the image to be highlighted or brightened, and the highlighting or brightening to fade to greater color saturation in the radially surrounding areas. Or course, any other pattern of density gradient can also be used.

It is also possible to incorporate reverse printing into the present invention. In reverse printing areas the white and color layers are applied over the foil layer patterns which leave blank spaces to form outlines of the letters of the desired printed written text, in a sort of "negative image." The letters therefore appear to be printed in a metallic type, but in reality the viewer is seeing the underlying foil with the shape of each letter defined by the outline of white or, preferably, color to form the written image.

Figure 6:
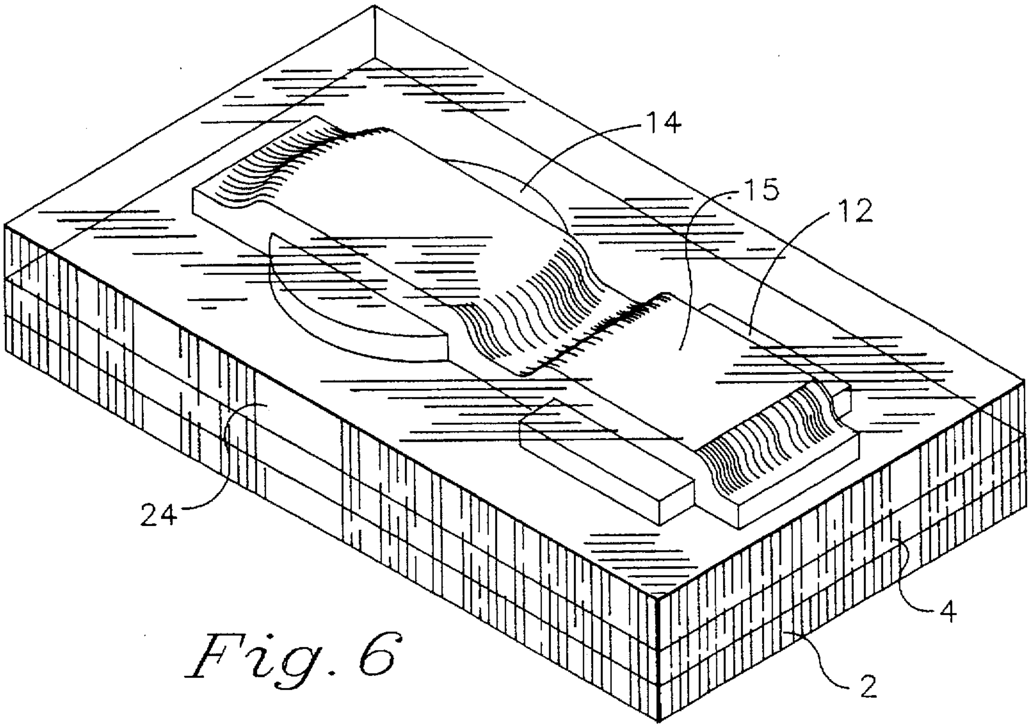
FIG. 6 is a schematic perspective view of the substrate of FIG. 4 further having a stripe of color dots applied thereto, the stripe overlaying a portion of each of the circular pattern and the square pattern of white dots, and also illustrating the application of a transparent overlay.

One can if desired also apply an optional transparent overlay 24 over all or part of the front of the sheet product, covering some or all of the process color layer, white layer and foil as illustrated in FIG. 6 (and as step D in FIG. 8). This overlay 24 may be a transparent film (such as a Mylar® film) or a sprayed-on coating which dries to a transparent film to form a protective coating and one which desirably also reflects light for added enhancement of the image. In most cases, this film or coating will be clear (i.e., colorless) but a color tint may be incorporated if desired. The overlay usually will cover all of the printed surface, but may alternatively cover only discrete parts. Such overlays are commonly used for instance, when the final product of the present printing process is to be formed into packaging which is likely to be handled extensively during the course of its ultimate marketing to the final purchaser, or where the sheet is to be a book jacket, etc.

Further, one can if desired apply an opaque coating 26 or a film across the back side 28 of paper layer 3, to avoid passage of stray light through the substrate 2. Typically the coating 26 will be a dense layer of black or grey ink, although a film such as a clear or tinted Mylar® film can conveniently be used.

If desired, and if the foil, paper or paper/foil laminate is suitable, the substrate may be embossed or debossed in selected areas or over a patterned line design. For instance, if human figures are shown in the image, one may emboss their linear outlines, or, conversely, one may emboss an area such as the area inside a circle or other closed graphic design appearing in the image. It is evident that there are numerous variations available to the designer.

The final image resulting from this printing process and the product incorporating that image are very striking and dramatic. Areas of highly saturated hues alternate and are interspersed with areas where pure whites appear and other areas where the colors are less saturated but take on a significant degree of appearance of depth or highlighting because of the underlying reflectivity of the foil. In yet other areas, the foil itself shows through as a silver highlight and in still other areas the color hues are markedly brightened by the underlying more dense white coating, or a combination of both enhanced brightness and reflectivity. The virtually infinite variety of combinations of visual appearances that can be created across the extent of the image makes this process extremely versatile technique and the resulting products are highly attractive and desirable. Further, because of the ability to use ordinary paper and foil substrates and to print the white and color layers using conventional printing equipment and operations, the invention gives the artist and graphic designer wide flexibility to create images with dramatic depth and highlighting, while yet keeping production costs low, making the entire invention quite economical.

The printed products of the present invention, with their dramatic images incorporating highlights and the appearance of depth, can be used for many purposes. Typical examples include advertising pieces; pages and covers for publications such as magazine and comic books; book jackets; product labels such as for bottles, cans and boxes; packaging such as containers, tubes, boxes, and cartons and the blanks from which they are shaped; signage; posters; point-of-sale displays; sports and other types of trading cards; logos; catalogues, circulars; inserts; programs; mailers; and many other products where a striking and eye catching visual image is desired. For instance, this technique has been used to print a graphic design on a paper blank which is to be formed into a box to contain a video game computer disk and its companion operating manual. In the highly competitive field of video games, the ability of a game's packaging to catch the customer's eye and draw the customer to select that game off the shelf in preference to the other competitive games which are also displayed is highly important. A direct visual comparison of the printed blank from the present process with a conventional prior art blank shows the product of this invention to be much more attractive and eye catching than the competitive product. Similarly, comparison with much higher priced blanks formed by complex printing techniques shows the economical printing technique of the present invention to produce images virtually indistinguishable without extremely close inspection from the images created by such exotic expensive techniques, but of course costing far less to produce.

It will be evident that there are numerous embodiments of the present invention which, while not expressly described above, are clearly within the scope and spirit of the invention. The above description is therefore to be considered exemplary only, and the actual scope of the invention is to be defined solely by the appended claims.

I claim:

1. A color printing process for printing a colored image which includes at least one area which has a highlighted or depth appearance on a substrate, which process comprises:

a. providing an opaque substrate sheet with a front side and a back side, at least a portion of said front side providing a reflective metallic appearance;

b. applying to an area of such reflective portion of said front surface a first coating comprising a plurality of white dots;

c. applying to at least portions of said first coating a second coating comprising process colors, said process colors comprising a plurality of component color dots disposed in groupings of at least two different densities, said densities and locations of said coating of white dots and groupings of color dots being the elements of said colored image and said highlighted or depth appearance to be produced; and d. creating said colored image by the juxtaposition respectively of said coating of white dots and said groupings of color dots over said reflective surface of said substrate;

whereby those portions of said colored image with lesser densities of white dots and of color dots permit visual observation of the underlying reflective substrate and yield a visual appearance of highlighting as compared to those other portions of said colored image where said densities of white dots or color dots is greater.

2. A process as in claim 1 further comprising forming said substrate from a sheet of metal foil or a laminate sheet comprising a reflective metallic foil or coating adhered to a paper backing.

3. A process as in claim 2 further comprising forming said substrate from a sheet of metal foil laminated to a paper backing.

4. A process as in claim 3 further comprising adhering said layer of metal foil entirely across the entire surface of said front side of said substrate.

5. A process as in claim 1 further comprising disposing said coating of white dots over said area of said reflective portion in groupings of at least two different densities, with the degree of opacity provided by each grouping being directly related to said density of said grouping.

6. A process as in claim 5 further comprising applying said white dots by screening utilizing at least two screens having different screen densities to apply said respective groupings of white dots at said respective different densities.

7. A process as in claim 6 further comprising providing a first grouping of lower density wherein said dots appear discrete under magnification and a second grouping of higher density wherein said dots do not appear fully discrete under magnification, said second grouping further presenting a visual appearance of a continuous coating.

8. A process as in claim 6 wherein said different white dot densities comprise segments of a gradient of white dot densities, said gradient extending across a portion of said surface of said substrate.

9. A process as in claim 8 wherein said gradient extends substantially linearly or radially.

10. A process as in claim 1 further comprising applying said color dots by screening utilizing at least two screens having different screen densities to apply said respective groupings of color dots at said respective different densities.

11. A process as in claim 10 wherein in a first grouping of lower density dots appear discrete under magnification and in a second grouping of higher density dots do not appear fully discrete under magnification and said second grouping presents a visual appearance of a continuous coating.

12. A process as in claim 10 wherein said different color dot densities comprise segments of a gradient of color dot densities, said gradient extending across a portion of said surface of said substrate.

13. A process as in claim 10 wherein said gradient extends substantially linearly or radially.

14. A process as in claim 10 further comprising applying said color dots of a plurality of color hues in a multi-color printing sequence such that the color image formed by combination of color hues provides a visual appearance of more than the number of color hues applied in said multi-color printing sequence.

15. A process as in claim 14 wherein said multi-color printing sequence comprises sequentially applying dots of four colors.

16. A process as in claim 15 further comprising said four colors of said applied color dots being yellow, cyan, magenta and black.

17. A process as in claim 16 further comprising replacing at least one of said yellow, cyan or magenta colors with another color of related hue.

18. A process as in claim 1 further comprising applying a transparent overlay over at least one of said groupings of color dots, accessible portions of said coating of white dots or accessible portions of said front side of said substrate.

19. A process as in claim 18 wherein said transparent overlay is formed by applying a transparent film or film-forming liquid and causing said liquid to solidify to a transparent film.

20. A process as in claim 19 wherein said transparent overlay is colorless.

21. A process as in claim 1 further comprising applying a coating or film to said back side of said substrate.

22. A process as in claim 1 further comprising embossing or debossing said substrate.

23. A printed article having an image thereon formed by the process of claim 1.

* * * * *

UNITED STATES PATENT AND TRADEMARK OFFICE

CERTIFICATE OF CORRECTION

PATENT NO. : 5,733,634

DATED : March 31, 1998

INVENTOR(S) : KAREL, Norman E.

It is certified that error appears in the above-identified patent and that said Letters Patent is hereby corrected as shown below:

COLUMN 2, LINE 55: replace "ea" with --area--.

Signed and Sealed this

First Day of December, 1998

*Attest:*

BRUCE LEHMAN

*Attesting Officer*

*Commissioner of Patents and Trademarks*